United States Patent [19]
Donzac et al.

[11] Patent Number: 5,397,621
[45] Date of Patent: Mar. 14, 1995

[54] METHOD OF MAKING COMPLEX HOLLOW PIECES BY UNIAXIAL HOT PRESSING COMPOSITE MATERIAL WITH A VITREOUS MOULD AND PIECES DERIVED FROM SAID METHOD

[75] Inventors: Jean-Marc N. P. Donzac; Nicolas Marceau, both of Saint Medard En Jalles, France

[73] Assignee: Aerospatiale Societe Nationale Industrielle, Paris, France

[21] Appl. No.: 978,926

[22] Filed: Nov. 19, 1992

[30] Foreign Application Priority Data

Nov. 29, 1991 [FR] France ................. 91 14860

[51] Int. Cl.⁶ ............... B32B 1/00; E04C 2/34; B28B 1/48
[52] U.S. Cl. .................... 428/178; 428/175; 428/188; 264/60; 264/154; 264/241; 264/257; 264/512; 52/806
[58] Field of Search ........... 428/156, 172, 288, 292, 428/174, 178, 398, 188, 116, 175, 251; 264/154, 60, 167, 241, 257, 512; 52/806; 65/18.1, 18.3, 68

[56] References Cited

U.S. PATENT DOCUMENTS 3,641,230 2/1972 Jenks ................. 264/154

4,857,093 8/1989 Prewo et al. ............. 65/36
4,961,771 10/1990 Brooke ................. 65/18.3

FOREIGN PATENT DOCUMENTS

| 291905 | 11/1988 | European Pat. Off. . |
| 458729 | 11/1991 | European Pat. Off. . |
| 431301 | 12/1991 | European Pat. Off. . |
| 2521126 | 8/1983 | France . |
| 2527517 | 12/1983 | France . |
| 2658753 | 8/1991 | France . |
| 1949209 | 4/1971 | Germany . |
| 3937769 | 5/1991 | Germany . |
| 2077938 | 12/1981 | United Kingdom . |
| 2116112 | 9/1983 | United Kingdom . |

Primary Examiner—Donald J. Loney
Attorney, Agent, or Firm—Nikaido Marmelstein Murray & Oram

[57] ABSTRACT

Introducing into a space delimited by the walls of a mould a sufficient quantity of a material required to obtain the final composite, placing in the material movable inserts corresponding to the hollow sections of the final piece, applying to the unit a uniformly distributed mechanical pressure under heat, extracting the material from the mould and mechanically removing the movable inserts from the material. Structural pieces formed of sandwich panels incorporating an internal stiffener.

6 Claims, 2 Drawing Sheets

METHOD OF MAKING COMPLEX HOLLOW PIECES BY UNIAXIAL HOT PRESSING COMPOSITE MATERIAL WITH A VITREOUS MOULD AND PIECES DERIVED FROM SAID METHOD

FIELD OF THE INVENTION

The invention concerns techniques for the production of bearing structures at high temperatures and producing a composite material with a vitreous mould and more particularly concerns a production method based on the pressing of materials and associated movable inserts.

BACKGROUND OF THE INVENTION

A vitreous mould composite material is understood to be a reinforcement in three-dimensional structures, the material being composed of ceramic fibers, such as SiC, C, $Al_2O_3$, $SiO_2$, etc., which may be long or short, and a vitreous mould material constituted by at least one standard oxide, such as $SiO_2$, $Al_2O_3$, $ZrO_2$, $B_2O_3$, or alkaline or alkalino-earth oxides, etc. These materials are densified by hot isostatic or uniaxial pressing making it possible to embody simple pieces, such as plates or caps.

The document FR-A 2 521 126 describes composite glass structures reinforced with discontinuous fibers of silicon carbide which possess good mechanical resistance, tenacity and stability to oxidation, even at high temperatures, and are thus adapted to the production of these simple pieces.

So as to embody composite items with complex shapes with a glass mould reinforced with fibers, known methods appear to be inadequate. In fact, the reinforcement of composite items by means of continuous fibers and obtained by the use of strips, felt or aligned fiber paper which are infiltrated by glass pulp, cut and then oriented and stacked in a mould for flat pressing, makes it possible to solely obtain a flat arrangement of fibers which cannot be deformed into complex shapes without the fibers being seriously deformed. So as to mitigate this drawback, there is a solution which consists of preimpregnating sheets with reinforcement fibers with a liquid containing a thermoplastic polymer bonding material and glass powder. The sheets are then cut into a particular pattern or model of the complex composite portion to be embodied and are then stacked on preforms which are hot-moulded. Finally, the formed item is heated to decompose and remove the temporary bonding material prior to hot pressing the treated item so as to form the final composite product with high resistance, as described in the document FR-A 2 527 517.

The hot pressing of these materials may be ensured, as demonstrated in the document FR-A 2 658 753, by employing at least one mould element made of a material resistant to high temperatures and which of course possesses mechanical resistance properties, as well as anisotropic thermal conductivity properties, so that the preferential thermal transfer is effected in the pressing oven in the direction of the zones of the piece most distant from the oven heating means.

These methods are therefore suitable to obtain some complex pieces but not all complex pieces and especially are not suitable for obtaining hollow complex pieces incorporating internal stiffeners.

With this aim in mind, the applicant has created a method for making pieces of this type.

SUMMARY OF THE INVENTION

The object of the invention is thus to provide a method for producing hollow complex pieces by the hot uniaxial pressing of a vitreous mould composite material, said method comprising:

introducing into a volume delimited by the walls of a mould a sufficient quantity of a material required to obtain the final composite, placing in the material movable inserts corresponding to the hollow sections of the final piece, applying under heat a uniformly distributed mechanical pressure to the material, extracting the material from the mould, removing the movable inserts from the material.

According to one particular characteristic of the invention, a layer of fibrous materials is placed at the bottom of the mould, a first set of inserts is disposed, the walls of said inserts are coated with a new layer of fibrous materials prior to placing a second set of inserts, and then the unit is coated with one upper layer of fibrous materials before applying the mechanical pressure.

The material introduced into the mould is composed of elements in the form of previously densified ceramic composites or is constituted by the basic material containing the fiber and the vitreous mould composite material or may be non-densified basic material and previously densified material. The material constituting the inserts is high-performing graphite or carbon-carbon composite material, the inserts already having been subjected to a surface treatment via the coating of a layer of material which is inert with respect to glass.

According to one particular characteristic of the invention, in order to embody thin plates, counterplates and/or counter-punches are disposed between the material and the tool exerting the mechanical pressure. Advantageously, the surfaces of the plates in contact with the material are coated with a calibrated layer of the product favoring removal of the unit from the mould.

The invention also concerns a structural piece obtained by means of said method, said piece consisting of a hollow sandwich panel formed of one lower skin, one upper skin and an intermediate stiffener which forms a brace between the skins and provides cells between its folds.

The intermediate stiffener has a developable symmetrical shape with respect to the median plane of the panel and its sharp angles are radiated so as to form quarter circles and thus avoids creating zones able to crush the fibers.

BRIEF DESCRIPTION OF THE DRAWINGS

Other characteristics and advantages of the invention shall appear more readily from a reading of the following description with reference to the accompanying drawings in which.

DETAILED DESCRIPTION OF THE PREFERRED EMBODIMENTS

Figure 1:
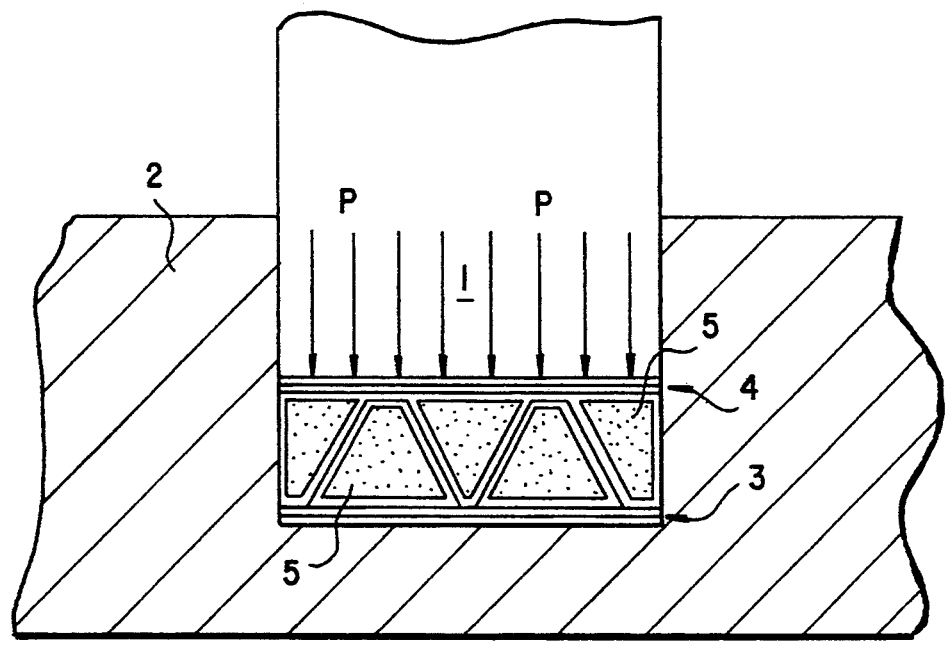
FIG. 1 is a diagrammatic cutaway view of a piece in the course of being produced.

FIG. 1 diagrammatically shows the production of the piece to be embodied.

The equipment used is able to hot uniaxially press a working volume 1 delimited by the wall of a mould 2.

A sufficient required quantity of material is introduced into this volume so as to obtain the final composite. This material is constituted by basic material elements containing the fiber and the vitreous mould composite material. The quantity of material is defined by calculation so as to satisfy the quality criteria of the material to be obtained. Pressings are effected at constant volume, in other words the material introduced into the mould has a volume equivalent to that of the densified piece to be obtained. The thickness of the walls is determined by the number of folds constituting it. This thickness is given by the following formula:

$$e = \frac{n}{V_F} \times \frac{ms}{mv}$$

in which e is the final thickness of the wall, mv the density of the fiber, $V_F$ the fiber volume percentage in the final material, ms the surface mass of a dry fold and n the number of folds.

By way of example, for n=1, mv=$2.55.10^3$ kg/m3, ms=0.443 kg/m2, $V_F$=0.43, e is =$0.4.10^{-3}$m.

So as to embody a piece as shown on FIG. 1, a layer of impregnated folds 3 is placed at the bottom of the mould 2 and then two inserts 5 are disposed above the impregnated material with their points directed upward. Then the slanted upper walls of the inserts are coated with a layer of impregnated folds prior to placing three inserts 5 with their points directed downward and which are placed inside recesses provided by the first two inserts. Finally, the unit is coated with an upper layer 4 of impregnated folds, the layers 3 and 4 forming the lower and upper skins of the piece.

The inserts 5 correspond to the hollow zones of the final piece. The material of the inserts is selected by taking into account the stresses involved in implementing the composites to be embodied, namely pressure, temperature and atmosphere. In the case of a vitreous mould composite material produced under a neutral atmosphere at a low pressing pressure, it is possible to use a high-performing graphite. Other cases are possible: use of carbon-carbon when it is desired to increase mechanical performance, or refractory steels fox implementing temperatures of less than 1000° C. under air, or precious metals, refractory metals and refractory composites for high-temperature applications under any type of atmosphere. It shall be observed that the material layers 3 and 4 and the inserts 5 are disposed inside the volume 1 according to a logical series, alternating the folds of fibers impregnated with glass powder held together by a bonding material and the inserts. For example, it is possible to provide a lower wall having five folds of superimposed fibers, the fifth fold having one frame oriented perpendicular to the preceding fold. Then, after having positioned a first set of inserts, two intermediate folds orientated in the same frame direction as the fifth fold are disposed on this first set of inserts. Following the adding of a second set of inserts, the formed upper skin and five superimposed folds are placed, the first fold having one frame oriented like the two intermediate folds.

So as to assemble and densify these elements intended to constitute the final piece, a uniformly distributed hot pressing under a pressure P is carried out, by a technique similar to those for producing simple pieces. Then the unit constituted by the piece and its inserts is freed by removing it from the mould chamber. Then the movable inserts are extracted by a simple mechanical action. This operation is facilitated by a prior surface treatment of the inserts. In the case of carbon-carbon or graphite inserts, this treatment is obtained via the coating of a fine layer of material which is inert with regard to the glass (for example, boron nitride or colloidal graphite). For refractory inserts (metals or composites), a mirror polish is necessary. The surfaces in contact with the material, whether they be plates, counterplates, mould punches or inserts, are coated with a calibrated layer of one tenth of a millimeter of boron nitride or colloidal graphite. A diffusion barrier is thus created between the graphite and the glass so as to avoid glueing of the material and consequently facilitate removal of the unit from the mould. Said coating may be obtained by projecting a dispersion of boron nitride into water or via a coating of colloidal graphite.

Figure 2:
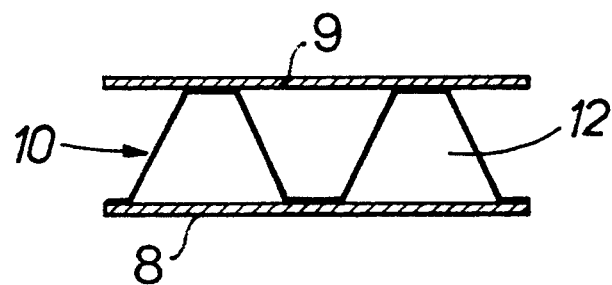
FIG. 2 is a cutaway view.

According to said method, it is possible to embody a sandwich panel whose two external skins are connected by an undulated stiffener, the 3 elements previously having been densified. FIG. 2 shows a self-stiffened panel formed of one lower skin 8, one upper skin 9 and one intermediate stiffener 10. The stiffener has a developable shape symmetrical with respect to the median plane. It forms a brace between the skins and provides cells 12 between said skins. The lateral pressing stresses are thus distributed homogeneously. The sharp angles of the stiffener are radiated so as to form quarter circles, thus avoiding creating zones able to crush the fibers.

So as to produce the sandwich panel of FIG. 2, three sub-assemblies are embodied by the hot compressing of the stacked prepregs, namely one lower skin 8 formed of five folds, one intermediate multifold or monofold stiffener 10 and one upper skin 9, also formed of five folds. The sandwich panels may result in assembling of previously densified and/or preimpregnated elements.

Figure 3:
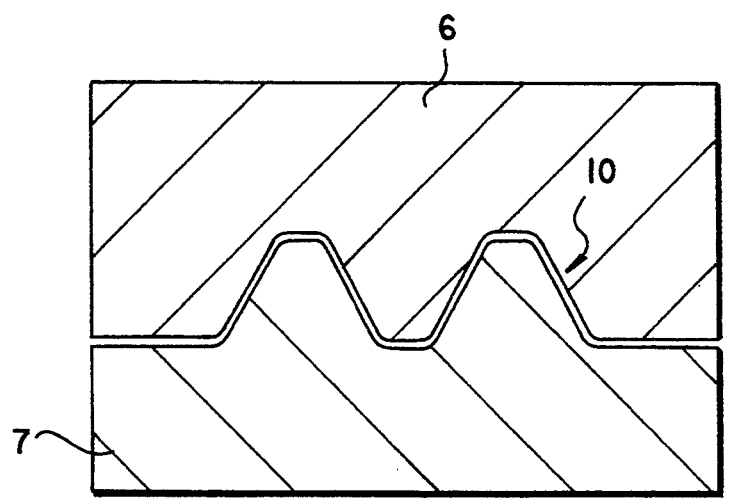
FIG. 3 is a cutaway view of a stiffening tool.

It is possible to preform the stiffener 10 as shown on FIG. 3 by using a tool whose lower punch 7 and upper punch 6 are profiled so as to incorporate the shapes of the inserts. The embodied stiffener is then placed in the mould above the lower inserts and is linked by pressing to the densified plates according to said method, the inserts also being removed after pressing.

Figure 4:
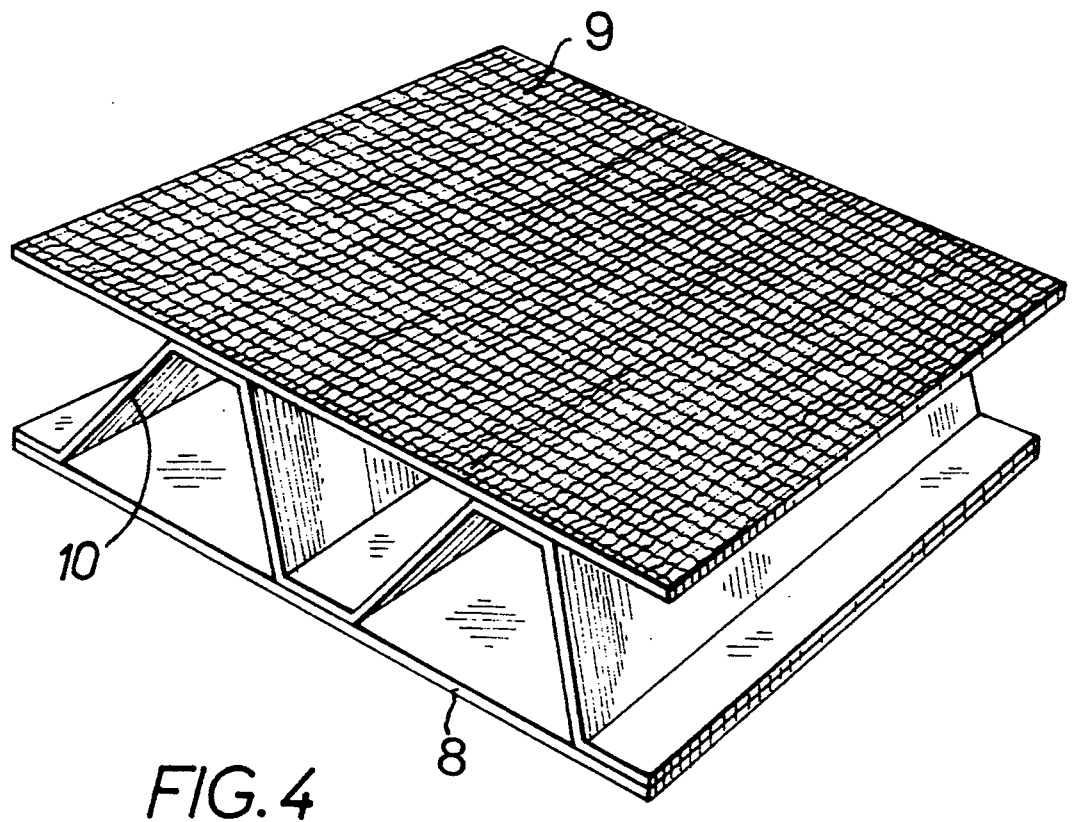
FIG. 4 is a perspective view of a panel obtained by means of the method.

The method is able to produce a structural panel, such as the one shown on FIG. 4 clearly showing the internal stiffener and the two skins.

What is claimed is:

1. A method for making complex hollow pieces via the hot uniaxial pressing a vitreous mould composite material, comprising:
   introducing into a volume delimited by a mould a fibrous material and movable inserts, said material being applied in the form of layers, said movable inserts being rigid bodies, wherein a first layer of said fibrous material is placed at the bottom of the mould, a first set of movable inserts is disposed above said first layer, said first set of movable inserts is coated with a second layer of said fibrous material, a second set of movable inserts is disposed above said second layer of fibrous material, said second set of movable inserts being placed in recesses corresponding to said first set of movable inserts, and said second set of movable inserts is coated with an upper layer of vitreous material, applying to said material a uniformly distributed mechanical pressure under heat, extracting said material from the mould, removing said movable inserts from said fibrous material.

2. A method according to claim 1, wherein at least one of said layers is made of a previously densified material.

3. A method according to claim 1, wherein said inserts comprise high-performing graphite or carbon-carbon.

4. A method according to claim 3, wherein said inserts have previously undergone a surface treatment comprising coating a layer of material which is inert to said vitreous mould composite material.

5. A method according to claim 1, wherein surfaces of said mould which contact said material are coated with a calibrated layer of a product favoring removal of said material from the mould.

6. A structural piece obtained by a method according to any one of claims 1 and 3 to 5, said piece comprising a hollow sandwich panel formed of one lower skin, one upper skin and one intermediate stiffener comprising a material which comprises vitreous mould ceramic fibers.

* * * * *